P. GENSHEIMER.
APPARATUS FOR PREPARING TINNED BOXES AND THE LIKE FOR DETINNING.
APPLICATION FILED JULY 1, 1914.
1,181,660.
Patented May 2, 1916.
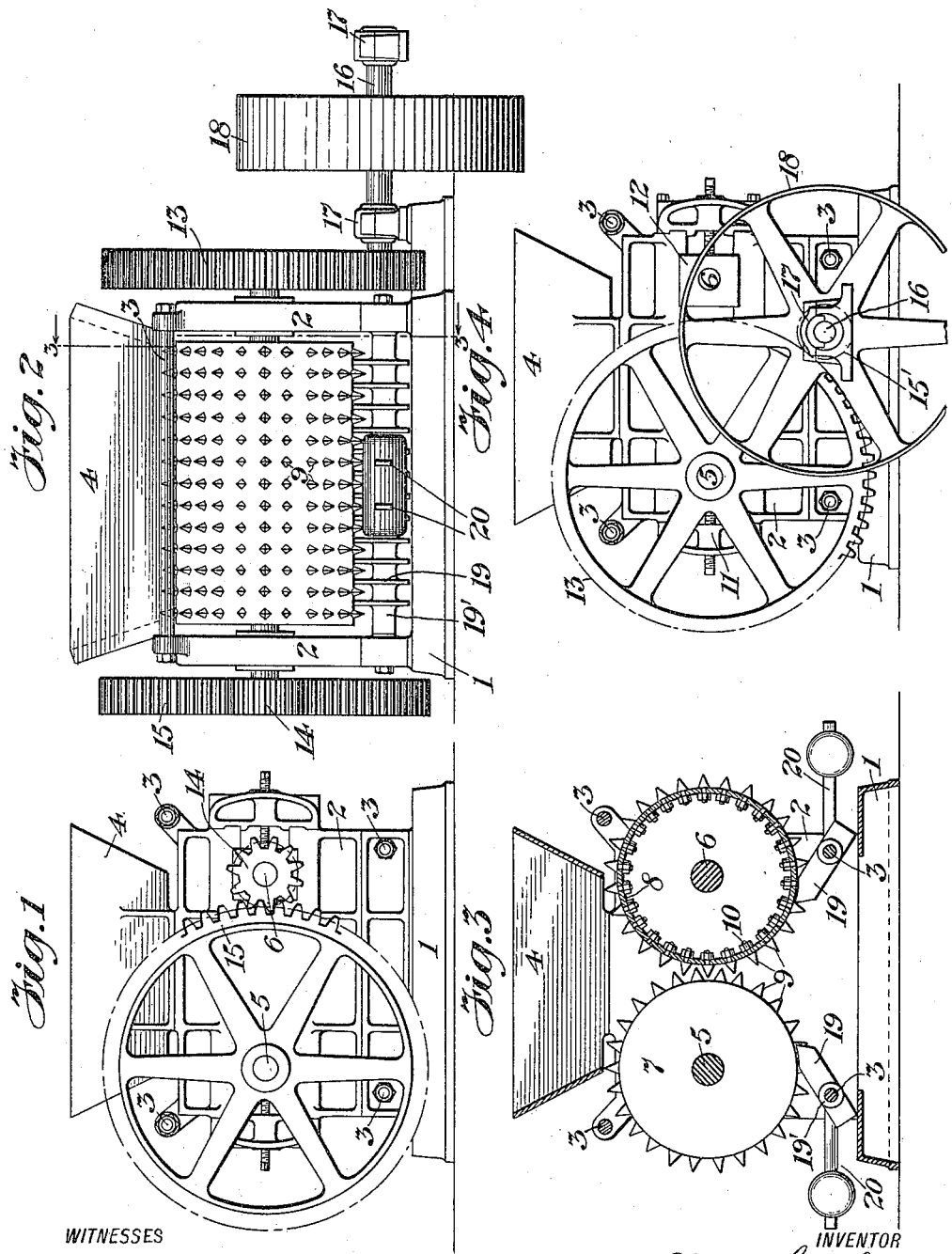
WITNESSES
Chas. F. Clagett
Christyne J. Butler.
INVENTOR
Philipp Gensheimer
BY
Chas. F. Ward
HIS ATTORNEY

UNITED STATES PATENT OFFICE.

PHILIPP GENSHEIMER, OF ELIZABETH, NEW JERSEY, ASSIGNOR TO GOLDSCHMIDT DETINNING COMPANY, OF NEW YORK, N. Y., A CORPORATION OF NEW JERSEY.

APPARATUS FOR PREPARING TINNED BOXES AND THE LIKE FOR DETINNING.

1,181,660.     Specification of Letters Patent.     Patented May 2, 1916.

Application filed July 1, 1914. Serial No. 848,506.

*To all whom it may concern:*

Be it known that I, PHILIPP GENSHEIMER, subject of the King of Prussia, German Emperor, and resident of Elizabeth, in the county of Union and State of New Jersey, have invented a certain new and useful Apparatus for Preparing Tinned Boxes and the like for Detinning, of which the following is a specification.

The present invention relates to the treatment of tinned boxes and the like preparatory to detinning the same by any of the usual methods of recovering the tin with which the sheet metal constituting the boxes and the like is covered. It has been heretofore suggested as a preparatory treatment of tinned boxes and the like to compress and perforate the same by passing them between spaced rolls having fixed pointed projections on their surfaces which penetrate the metal, and while this preliminary treatment has been found to be more or less satisfactory, still better and more economical results are predicated upon the present invention which contemplates the perforation of the metal forming the boxes, and preferably simultaneously therewith, the rending or tearing apart of the metal so that the active detinning agent may be brought more intimately into contact with the coating of tin on the metal base. A convenient and economical form of apparatus for carrying out the operation aforesaid comprises a pair of spaced rolls provided with projections on their surfaces which perforate the metal, and the individual rolls being driven at different speeds relative to each other, whereby the boxes or the like are torn apart and the sheet metal constituting the boxes is rent or torn into pieces or fragments which greatly facilitate the action of the detinning agent.

A suitable mechanism for carrying out the invention is illustrated in the accompanying drawings, in which, Figure 1 is an end elevation of the machine, Fig. 2 is a side elevation, Fig. 3 is a vertical section on the line 3—3 of Fig. 2, with one of the rolls shown in elevation. Fig. 4 is an end elevation of the machine on the driving side thereof.

Referring to the drawings, 1 indicates a suitable base to which is secured vertical standards 2 which constitute the housings for the rolls and which are suitably spaced and braced together by means of tie rods 3 located approximately at the corners of the said frames. Mounted above the side frames is a hopper 4 which is adapted to receive the boxes and similar articles made of tinned metal which are to be preliminarily treated for the detinning operation according to the present invention.

Journaled in suitable horizontally adjustable bearings 11 and 12, are parallel shafts 5 and 6, upon which are rigidly secured drums 7 and 8 respectively, which may be brought to any desired degree of proximity by adjusting the bearing blocks 11 and 12. The cylindrical surface of each of the rolls 7 and 8 is provided with a multiplicity of sharp pointed spikes or projections 9, which in the preferred form of the apparatus take the form of pointed metal cones having screw-threaded shanks passing through perforations in the walls of the drums which shanks are engaged by nuts 10 which serve to lock the projections to the drum and admit of damaged or broken spike-like members being readily removed or replaced. These pointed spikes or projections are preferably arranged in longitudinal and circumferential rows in the cylinder walls, as indicated in Figs. 2 and 3. For the purposes of the present invention, the rolls 7 and 8 are driven at different speeds, that is to say, one of the rolls is driven at a relatively higher speed than the other, and in order to effect the differential rotation of the respective drums, there is secured to the ends of the shaft 5 of roll 7, two relatively large toothed gears 13 and 15, the former of which meshes with the driving pinion 15' upon the countershaft 16 mounted in bearings 17 and driven by a belt pulley 18. The gear 15 on the opposite end of shaft 5 is in mesh with a smaller gear 14 on the corresponding end of shaft 6 so that the shaft 6 and its associated roll 8 is driven at a speed relatively higher than that of shaft 5, depending upon the relative sizes of the meshing gears 15 and 14 respectively. In the machine illustrated, the relative speeds of drums 7 and 8 is 1 to 5, that is to say drum 8 makes approximately five revolutions, while drum 7 is making one.

Pivotally mounted on the lower tie bars 3 are sets of scraper bars 19, preferably formed as flat pointed finger-like elements connected together by an integral sleeve 19' and provided with counterweighted arms 20 which serve to hold the pointed ends of the bars 19 in engagement with the surfaces of the rolls 7 and 8 respectively, between the peripheral rows of spikes or projections thereon.

In carrying out the invention with the machine, as described, the boxes or other receptacles and articles made of tinned sheet metal are fed into the hopper 4 from whence they are discharged through the open bottom thereof between the rolls 7 and 8 where the boxes are at once crushed and perforated throughout by the spikes or projections 9 on the surfaces of the rolls, and because of the greater speed of roll 8, the spikes or projections 9 thereon travel faster than the corresponding spikes on the roll 7, with the result that the spikes on roll 8 tear and rend the parts of the box or other receptacle apart and also rend the metal constituting the separate elements of the boxes or the like into pieces so that the tinned sheet metal is delivered from the lower part of the machine in perforated and torn fragments presenting jagged edges which afford ready access of the detinning agent to the tinned coating. The rending or tearing of the metal, as well as the tearing apart of the sheets forming the tinned receptacle and the opening up of the joints thereof is due, of course, to the different speeds of travel of the spikes or projections on the respective drums. The relatively moving impaling spikes on drum 7 for example act as anchors to hold back one portion of the box while the impaling spikes on roll 8 traveling at a much faster rate actually tear and disrupt the fabric of the box while the box is being crushed and compressed between the rolls.

In order to clear the torn and separated sections of metal from the spikes, the scraper bars 19 are held in contact with the peripheral surface of the respective rolls between the rows of spikes, and the relatively sharp forward ends of these bars pass between the scraps of metal impaled on the spikes and the roll surfaces and effectively strip the metal scrap from the spikes and permit the same to drop off into suitable receptacles provided therefor.

What I claim is:—

1. A machine for preparing tinned boxes and the like for detinning, comprising two spaced rolls provided with metal perforating and rending projections on the surfaces thereof and means for driving said rolls at differential speeds, whereby boxes and the like fed between the rolls are crushed, perforated and torn into fragments.

2. A machine for preparing tinned boxes and the like for detinning, comprising two spaced rolls provided with metal perforating and rending projections on the surfaces thereof, means for driving said rolls at differential speeds, whereby boxes and the like fed between the rolls are crushed, perforated and torn into fragments, and means for removing sections of torn metal adhering to said rolls.

Signed at New York city in the county of New York and State of New York this 25 day of June A. D. 1914.

PHILIPP GENSHEIMER.

Witnesses:
ROBERT F. GREACEN,
BENJAMIN ANDERSON.

Copies of this patent may be obtained for five cents each, by addressing the "Commissioner of Patents Washington, D. C."